United States Patent
Laucournet et al.

(10) Patent No.: US 9,312,581 B2
(45) Date of Patent: Apr. 12, 2016

(54) METHOD FOR RECYCLING LITHIUM BATTERIES AND/OR ELECTRODES OF SUCH BATTERIES

(75) Inventors: Richard Laucournet, La Buisse (FR); Sandrine Barthelemy, Saint Marcellin (FR); Nathalie Diaferia, Livet et Gavet (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/343,651

(22) PCT Filed: Sep. 5, 2012

(86) PCT No.: PCT/IB2012/054581
§ 371 (c)(1),
(2), (4) Date: Apr. 22, 2014

(87) PCT Pub. No.: WO2013/035048
PCT Pub. Date: Mar. 14, 2013

(65) Prior Publication Data
US 2014/0227153 A1     Aug. 14, 2014

(30) Foreign Application Priority Data
Sep. 7, 2011   (FR) .................................... 11 57939

(51) Int. Cl.
| | | |
|---|---|---|
| H01M 10/54 | (2006.01) | |
| C22B 7/00 | (2006.01) | |
| C22B 26/12 | (2006.01) | |
| H01M 4/131 | (2010.01) | |
| H01M 10/052 | (2010.01) | |
| H01M 4/485 | (2010.01) | |
| H01M 4/58 | (2010.01) | |

(52) U.S. Cl.
CPC ............ H01M 10/54 (2013.01); C22B 7/006 (2013.01); C22B 26/12 (2013.01); H01M 4/131 (2013.01); H01M 10/052 (2013.01); H01M 4/485 (2013.01); H01M 4/5825 (2013.01); *Y02E 60/122* (2013.01); *Y02P 10/234* (2015.11); *Y02T 10/7011* (2013.01); *Y02W 30/84* (2015.05)

(58) Field of Classification Search
None
See application file for complete search history.

(56) References Cited

U.S. PATENT DOCUMENTS

| 5,888,463 A | 3/1999 | McLaughlin et al. |
| 6,217,768 B1 | 4/2001 | Hansen et al. |
| 2007/0196725 A1 | 8/2007 | Tedjar et al. |
| 2011/0147679 A1 | 6/2011 | Inukai et al. |

FOREIGN PATENT DOCUMENTS

| CN | 101847763 | | 9/2010 |
| CN | 101916889 | | 12/2010 |
| CN | 102208706 | * | 10/2011 |
| EP | 2 306 583 A1 | | 4/2011 |
| EP | 2 450 991 A1 | | 5/2012 |
| FR | 2 796 207 A1 | | 1/2001 |
| WO | WO 98/41479 A1 | | 9/1998 |
| WO | WO 2005/101564 A1 | | 10/2005 |
| WO | WO 2012/072619 A1 | | 6/2012 |

OTHER PUBLICATIONS

International Search Report issued Nov. 12, 2012, in PCT/IB12/054581 filed Sep. 5, 2012.
Xu, et al., "A review of processes and technologies for the recycling of lithium-ion secondary batteries", Journal of Power Sources, vol. 177, No. 2, Elsevier, XP022450299, 2008, pp. 512-527.
Castillo, et al., "Advances in the recovering of spent lithium battery compounds", Journal of Power Sources, vol. 112, No. 1, Elsevier, XP004387654, 2002, pp. 247-254.

* cited by examiner

*Primary Examiner* — Steven Bos
(74) *Attorney, Agent, or Firm* — Oblon, McClelland, Maier & Neustadt, L.L.P.

(57) ABSTRACT

The invention relates to a method for recycling lithium batteries and more particularly batteries of the Li-ion type and the electrodes of such batteries.
This method for recycling lithium battery electrodes and/or lithium batteries comprises the following steps: a) grinding of said electrodes and/or of said batteries, b) dissolving the organic and/or polymeric components of said electrodes and/or of said batteries in an organic solvent, c) separating the undissolved metals present in the suspension obtained in step b), d) filtering the suspension obtained in step c) through a filter press, e) recovering the solid mass retained on the filter press in step d), and suspending this solid mass in water, f) recovering the material that sedimented or coagulated in step e), resuspending this sedimented material in water and adjusting the pH of the suspension obtained to a pH below 5, preferably below 4, g) filtering the suspension obtained in step f) on a filter press, and h) separating, on the one hand, the iron by precipitation of iron phosphates, and on the other hand the lithium by precipitation of a lithium salt.
The method of the invention finds application in the field of recycling of used batteries, in particular.

19 Claims, 4 Drawing Sheets

Scale 2 theta

Figure 1:
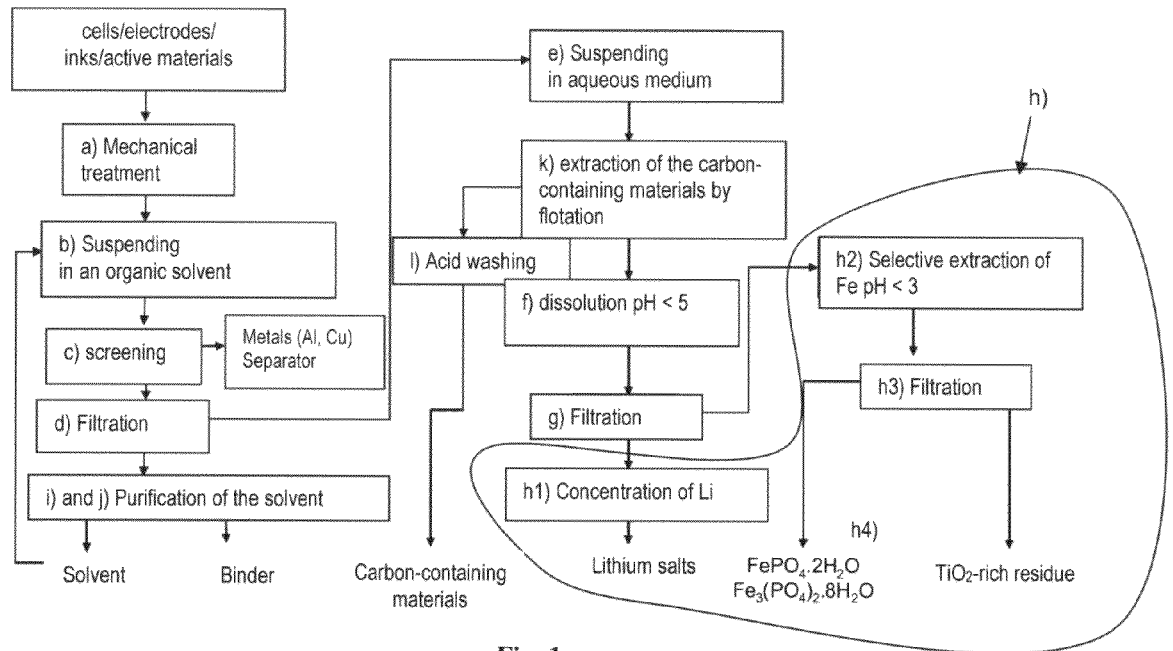

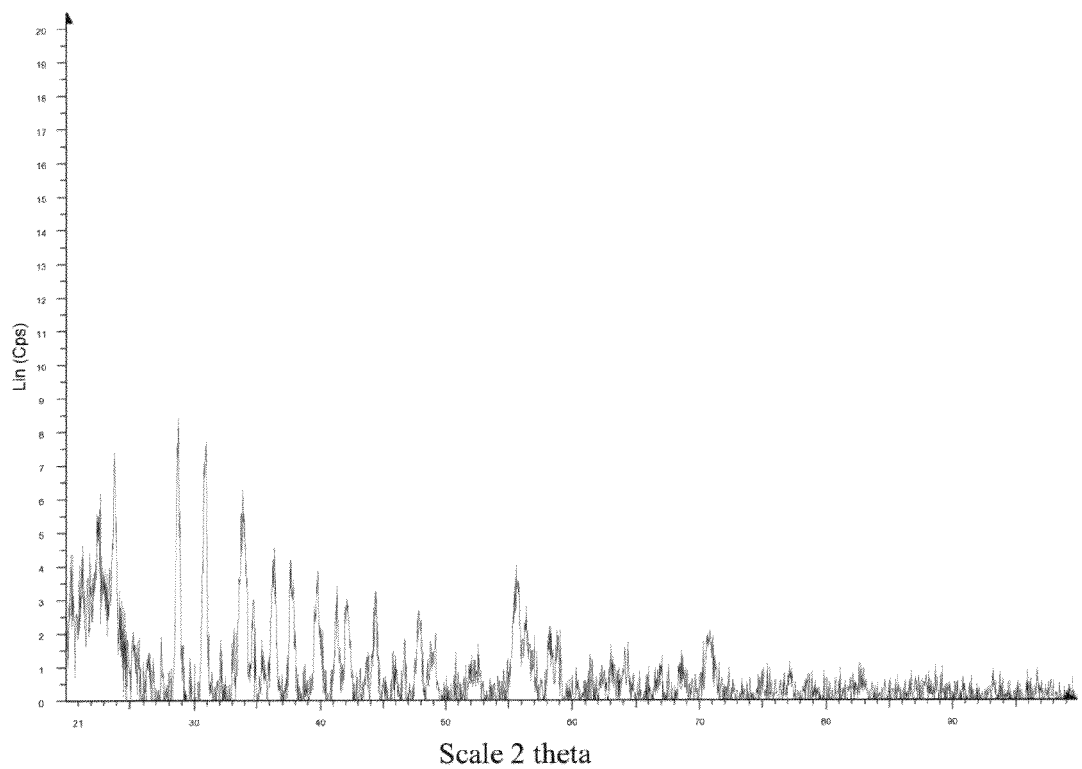
Fig. 3 X-ray diffraction pattern of $Fe_2(PO_4)_3 \cdot 8H_2O$
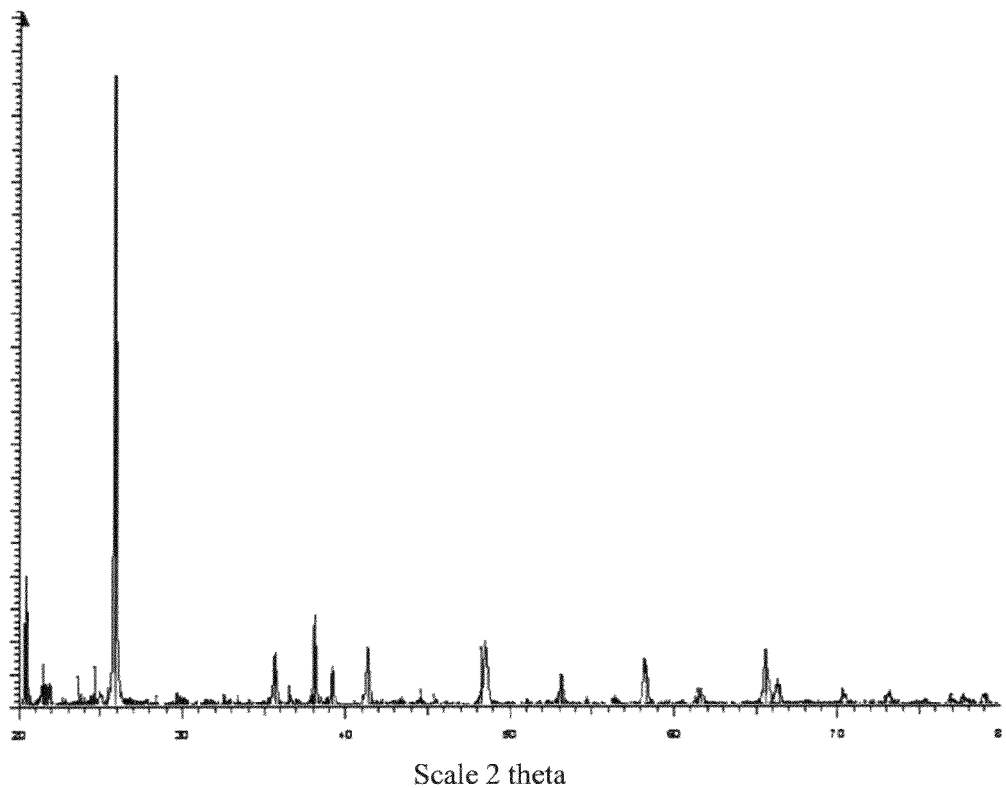
Fig. 4: X-ray diffraction pattern of $FePO_4 \cdot 2H_2O$

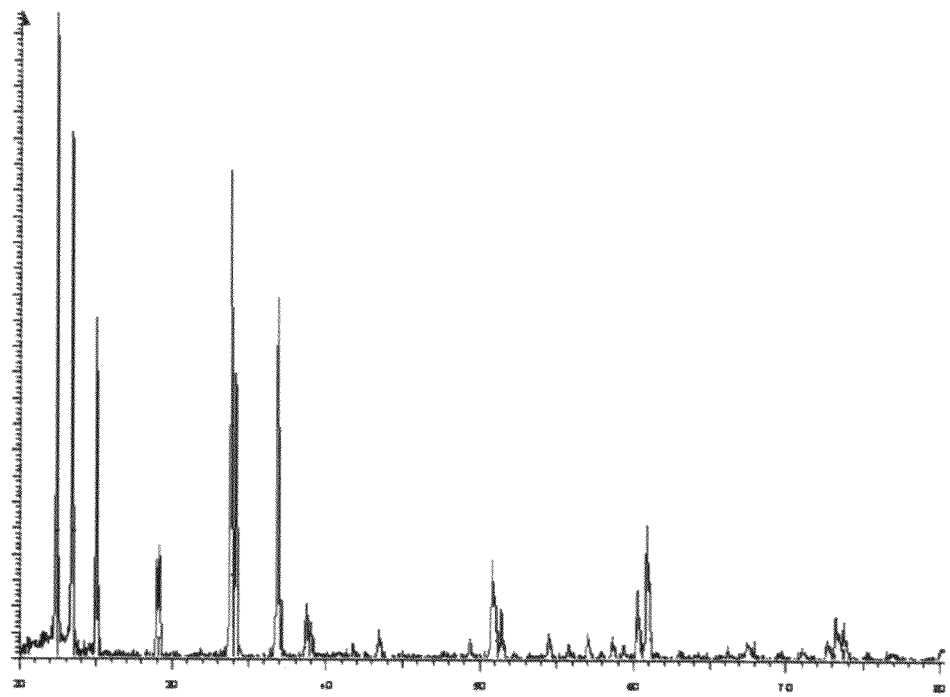
Fig. 5: X-ray diffraction pattern of $Li_3PO_4$
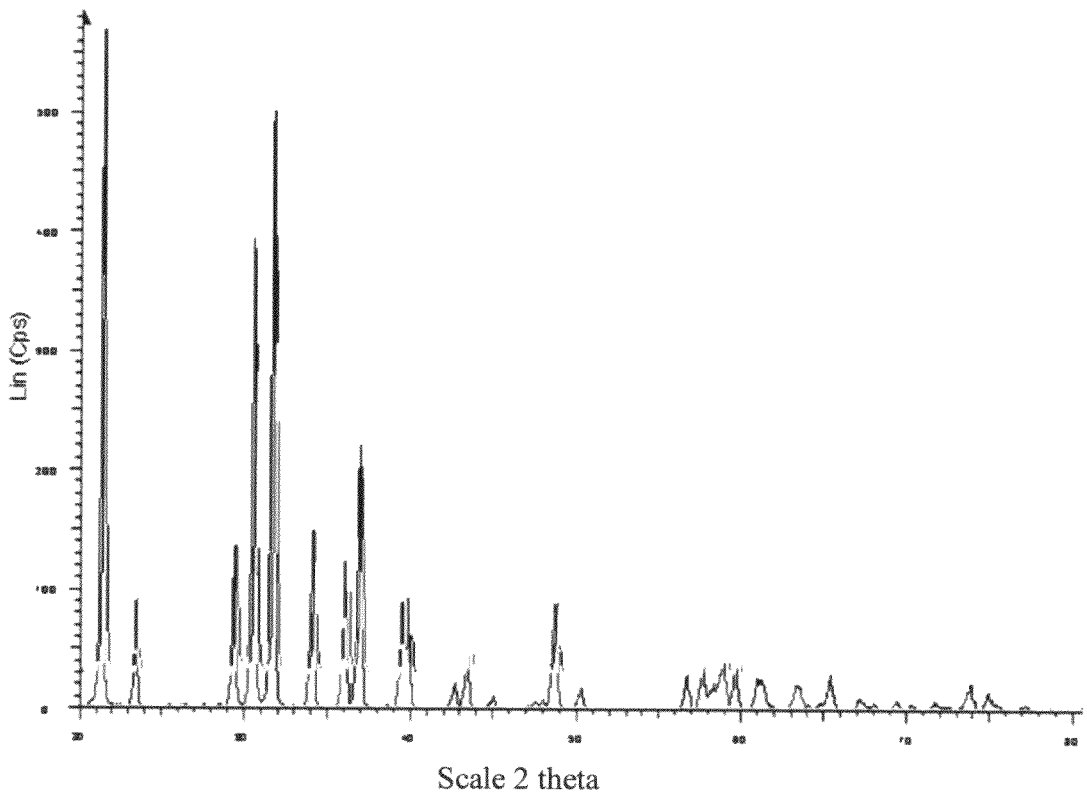
Fig. 6: X-ray diffraction pattern of $Li_2CO_3$

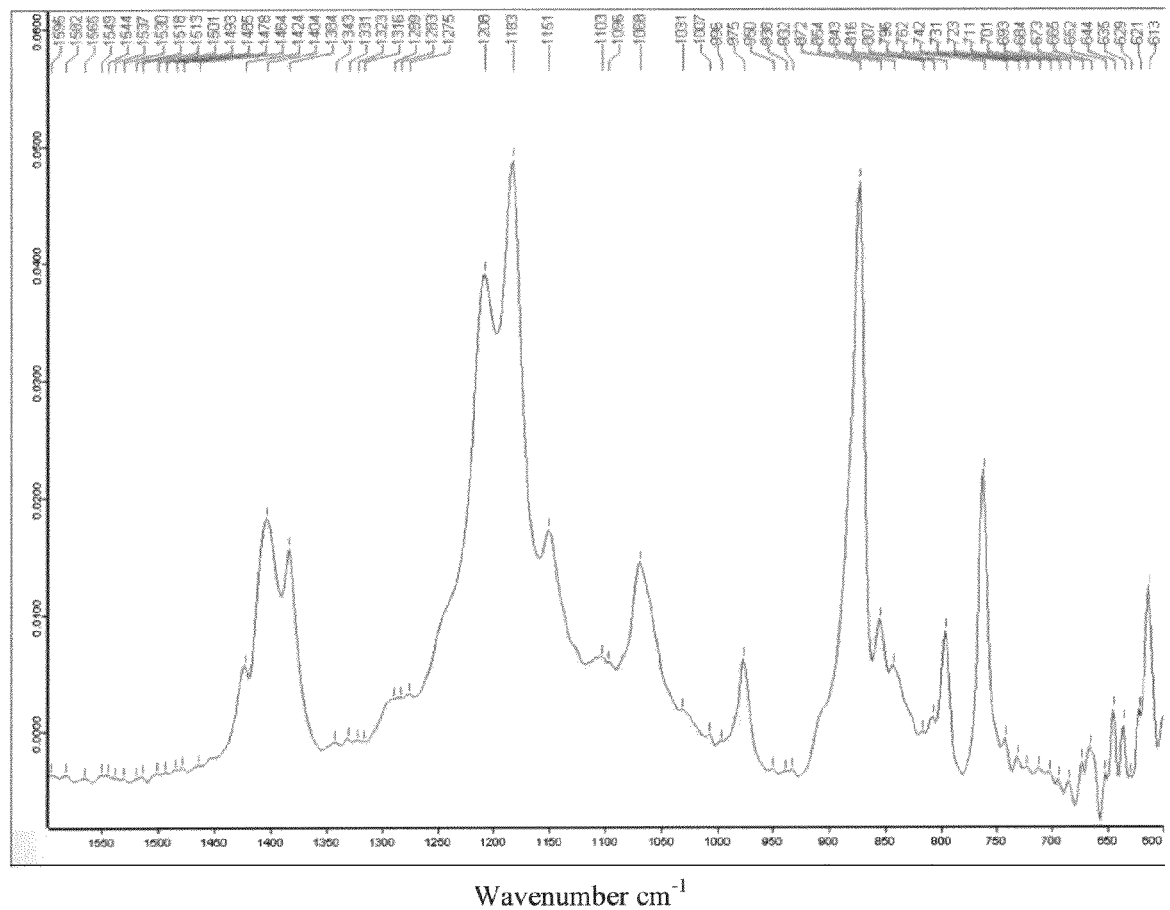
Fig. 7 FTIR analysis of the PVDF recovered at the end of the step j

METHOD FOR RECYCLING LITHIUM BATTERIES AND/OR ELECTRODES OF SUCH BATTERIES

CROSS-REFERENCE TO RELATED APPLICATIONS

This application is a National Stage of PCT/IB2012/054581 filed on Sep. 5, 2012. This application is based upon and claims the benefit of priority to French Application No. 11 57939 filed Sep. 7, 2011.

The invention relates to a method for recycling lithium batteries and more particularly batteries of the Li-ion type and the electrodes of such batteries.

The market for lithium batteries, also called Li-ion batteries, is now growing strongly because of new applications connected mainly with the emergence and development of hybrid vehicles, all-electric vehicles, and portable electrical equipment.

These Li-ion batteries are tending to supplant the earlier technologies such as nickel/cadmium and nickel/metal hydride batteries.

In the field of lithium batteries, batteries of the LFP type in which the electrodes are made of mixed lithium and iron phosphate ($LiFePO_4$) and of graphite, and batteries of the LFP/LTO type, in which the electrodes are made of mixed lithium and iron phosphate and of mixed lithium and titanium oxide ($Li_4Ti_5O_{12}$), are present in numerous applications.

These two types of batteries now offer enormous prospects of applications in terms of market.

In fact:
the LFP/G ($LiFePO_4$/graphite) batteries have the following typical characteristics:
Number of cycles: 2800,
Recharge time: between 30 and 120 minutes,
Energy density: 100 Wh/kg and 2000 W/kg.
Consequently, they are well suited to transport applications such as the electric vehicle (EV), rechargeable hybrid vehicle (PHEV), electric buses, trucks, bicycles and scooters.
the LFP/LTO ($LiFePO_4$/$Li_4Ti_5O_{12}$) batteries have the following typical characteristics:
Number of cycles: 30 000,
Recharge time: 4 minutes,
67 Wh/kg and 8000 Wh/kg.

The main applications of these batteries are the hybrid vehicle (HEV), rechargeable hybrid vehicle (PHEV), means for urban transport rechargeable at each station (trams, buses), electricity storage and recharging infrastructures (PHEV and EV).

Moreover, increasing environmental constraints, such as directive 2006/66/CE of Sep. 6, 2006, require battery manufacturers to undertake the recycling of batteries that they market.

Recently, quite particular attention has been directed to the problems of the resources necessary for technologies under development, especially rare and strategic resources. Although the LFP and LTO batteries do not appear to be directly affected by these materials, there is an increasing willingness to push for the reuse of materials in a "closed loop" for certain industries that are large consumers of such materials.

More particularly, the materials contained in these batteries and whose reuse is of interest are titanium, iron and lithium, the main constituents of the electrodes of these batteries.

To date, the methods for battery recycling can be divided into two main families: treatments by pyrometallurgy and treatments by hydrometallurgy.

The pyrometallurgical treatments, described in particular in patent application EP 1589121 and patent application WO 2011/035915, consist of burning the batteries completely in a reducing medium (gas burners) using the organic material (polymers, carbon-containing materials) that they contain as a source of energy and as a reducing agent. After combustion, a metal alloy containing the heaviest metallic elements (Co, Ni, Mn, Cu) is recovered. Lithium, a light element, is removed in the slag and in the fumes along with the aluminum. These methods, which are certainly very robust, do however have many drawbacks such as:

a low rate of recovery and valorisation of the materials contained in the batteries because only the noble metals are recovered, emission of toxic gases (HF, dioxins), which must be treated so that they have no environmental impact.

Moreover, for obvious economic reasons, these methods are solely viable for chemistries of electrodes with high contents of cobalt and/or nickel.

Treatments by the hydrometallurgical route consist of carrying out a mechanical grinding treatment of the battery and then recovering the black mass composed of the pulverulent active materials (iron and lithium, cobalt, etc.), using acid attack to dissolve the active materials not containing carbon, and then precipitating the elements to be recovered.

For example, patent application EP1733451 proposes completely dissolving the active materials in concentrated sulfuric acid (2N) at 80° C. The solid/liquid ratio is not stated. This highly acidic attack has the effect of contaminating the solution with copper from the electrode collector. It is necessary to use steel shot to recover the copper. Next, the solution pH is increased to 3.85 by adding concentrated soda to precipitate the iron in the form of hydroxide. If the active material contains cobalt, the pH is fixed at 5.8 by adding concentrated soda and then the bath is electrolyzed to recover the cobalt in metallic form. The particular case of the active material LFP is illustrated but only by the hydrometallurgical treatment of a powder synthesized ad hoc and not of a real electrode or of a complete battery that is worn out or does not comply. Complete dissolution is similar to the preceding case but in the presence of hydrogen peroxide at 30%, the iron is precipitated identically and the lithium is recovered by precipitation of a phosphate from a basic solution at pH=12.1, then acidified by adding 85% phosphoric acid and then alkalized again to pH above 12. The purity of the products obtained (iron hydroxide and lithium phosphate) is not mentioned and nor is the efficiency of recovery. This patent application does not state the manner of recovery of the other materials included in the composition of the battery, nor even their utilization.

U.S. Pat. No. 5,888,463 also describes complete acid attack of the lithium-based active materials with sulfuric acid with a view to recovering the lithium in the form of a carbonate. The recovery of the other elements of the active material is not stated, nor that of the other materials included in the composition of an Li-ion battery.

To summarize, the state of the art shows that:
the pyrometallurgical routes are robust methods with few steps, but do not allow the valorisation of a large amount of materials with a view to subsequent reuse. These routes are based on the recycling of metallic elements with high added value and require subsequent refining steps for purifying the residual metal alloy that are difficult to adapt to and not very suitable for batteries manufactured on the basis of LFP and/or LTO. Moreover, from an environmental standpoint these routes are sources of atmospheric pollution and produce large amounts of greenhouse gases, and the hydrometallurgical routes can allow the recovery of a larger number of materials, but are focused solely on the recovery of elements such as lithium, iron, manganese or cobalt. They do not aim to recycle a larger number of compounds such as binders or current collectors as well as the carbon-containing active materials. Furthermore, the purity of the products recovered is most often unknown, which makes their recovery uncertain. The treatment of LTO is not discussed.

The invention aims to overcome the drawbacks of the methods of the prior art by proposing a method for recycling lithium batteries and more particularly batteries whose electrodes are based on LFP/G and/or LFP/LTO, which makes it possible to recover a large number of materials, some of which can be reintroduced into the manufacturing chain for new batteries, but is not limited just to the "noble" materials such as the metals lithium, iron and titanium.

In fact, with the method of the invention, it is also possible to recover the binders contained in the electrodes, the carbon-containing active materials, the current collectors and even the solvent used in the method itself.

For this purpose, the invention proposes a method for recycling lithium battery electrodes and/or lithium batteries, characterized in that it comprises the following steps:

a) grinding said electrodes and/or said batteries, b) dissolving the organic and/or polymeric components of said electrodes and/or of said batteries in an organic solvent, c) separating the undissolved metals of the current collectors present in the suspension obtained in step b), d) filtering the suspension obtained in step c) through a filter press, e) recovering the solid mass retained on the filter press in step d), and suspending this solid mass in water, f) recovering the material that sedimented or coagulated in step e), resuspending this sedimented material in water and adjusting the pH of the suspension obtained to a pH below 5, preferably below 4, g) filtering the suspension obtained in step f) on a filter press, and h) separating, on the one hand, iron by precipitation of iron phosphates and, on the other hand, lithium by precipitation of a lithium salt.

In a first embodiment of the invention, in step f) the pH is such that 3<pH<4, so that only the lithium goes into solution in the aqueous medium, and step h) comprises the following steps:

h1) recovering the filtrate resulting from step g) and precipitating a lithium salt, h2) recovering the solid fraction retained on the filter press in step g), and dissolving this solid fraction in water, adjusting the pH to 2<pH<3, at room temperature, whereby the $Fe^{2+}$ and/or $Fe^{3+}$ ions and the phosphates $PO_4^{3-}$ go into solution and the titanium remains in solid form, h3) filtering the suspension obtained in step h2) and recovering the solid titanium on the filter, and h4) precipitating the iron phosphate contained in the filtrate obtained in step h3).

In a second embodiment of the invention, in step f) the pH is adjusted to pH<1 and step h) comprises the following steps:

h5) recovering the solid titanium retained on the filter in step g), h6) recovering the filtrate obtained in step g) and precipitating the iron phosphate, h7) separating the iron phosphate by filtering the filtrate obtained in step h6), and h8) recovering the filtrate obtained after the filtration in step h7) and precipitating a lithium salt.

In a first variant, step h4) of precipitating the iron phosphate, in the first embodiment of the method of the invention, or step h6) of precipitating the iron phosphate in the second embodiment of the method of the invention, comprises the following steps:

h4a) or h6a) adjusting the pH of the filtrate recovered to a pH equal to 5, whereby a precipitate is formed, h4b) or h6b), recovering the precipitate formed in step h4a) or h6a) by filtering the suspension obtained in step h4a) or h6a), washing with water and drying of this precipitate at a temperature less than or equal to 30° C. under primary vacuum, whereby iron phosphate of formula $Fe_3(PO_4)_2 \cdot 8H_2O$ is obtained.

In a second variant, step h4) of precipitating the iron phosphate, in the first embodiment of the method of the invention, or step h6) of precipitating the iron phosphate in the second embodiment of the method of the invention, comprises the following steps:

h4c) or h6c): adding 1 vol %, relative to the total volume of filtrate recovered, of $H_2O_2$ at 30 vol %, h4d) or h6d) adjusting the pH of the solution resulting from step h4c) or h6c) to a pH equal to 5, recovering the precipitate formed, washing and drying this precipitate at 50° C., in air, whereby amorphous iron phosphate $FePO_4 \cdot 2H_2O$ is obtained.

Preferably, after step h4d) or h6d), the amorphous iron phosphate obtained is calcined at 500° C. in air, whereby crystalline iron phosphate $FePO_4 \cdot 2H_2O$ is obtained.

Regarding the step of precipitating a lithium salt, designated h1) in the first embodiment of the method of the invention and h8) in the second embodiment of the method of the invention, in a first variant, it comprises the following steps:

h1a) or h8a) mixing the filtrate obtained in step g) or mixing the filtrate obtained after the filtration in step h7) with an aqueous solution having a pH above 12 and containing a quantity of phosphate ions ($PO_4^{3-}$) greater than one third of the quantity of lithium ions ($Li^+$) and heating the mixture thus obtained at 50° C., whereby a precipitate is formed, and h1b) or h8b) washing the precipitate thus obtained with water, whereby lithium phosphate $Li_3PO_4$ is obtained.

In a second variant, step h1) of the first embodiment of the method of the invention or step h8) of the second embodiment of the method of the invention, of precipitation of a lithium salt, comprises the following steps:

h1c) mixing the filtrate obtained in step g), recovered in step h7) or h8c), with an aqueous solution having a pH above 12 containing a quantity of carbonate ions ($CO_3^{2-}$) at least equal to half the quantity of lithium ions ($Li^+$) contained in the mixture, h1d) or h8d) heating the mixture from step h1c) or h8c) at a temperature between 90° C. and 100° C., then filtration at a temperature of 100° C., whereby a dry extract of lithium carbonate $Li_2CO_3$ is obtained.

In a third variant, step h1) of the first embodiment of the method of the invention or step h8) of the second embodiment of the method of the invention, of precipitation of a lithium salt, comprises the following steps:

h1e) or h8e) passing the filtrate obtained in step g) or the filtrate obtained after step h7) over a cationic ion-exchange resin at a ratio moles of $Li^+$ present in the solution/g of resin between $10^{-6}$ and $10^{-2}$, h1f) or h8f) contacting the resin resulting from step h1e) or h8e) with a solution of acid at a pH<3 with a liquid/resin volume ratio <1, h1g) or h8g) recovering the lithium carbonate by filtration, at 100° C., from the suspension obtained in step h1f) or h8f).

In all its variants and all its embodiments, the method of the invention can further comprise:
- a step i) of purifying the solvent contained in the filtrate obtained in step d), by centrifugation until a colorless liquid is obtained,
- a step j) of evaporation-condensation of the colorless liquid obtained in step i) at a temperature less than or equal to 80° C. but greater than or equal to 60° C., whereby on the one hand a solid is recovered consisting of the binder of the electrodes and a liquid consisting of the organic solvent used in step d), and
- optionally a step n) of recycling the solvent obtained in step j) to step b).

The method of the invention can also comprise:
- a step k) of extracting the carbon-containing material from the suspension obtained in step e), by flotation,
- a step l) of washing these carbon-containing materials with an aqueous solution acid having a pH<3, and
- a step m) of filtering these carbon-containing materials.

Preferably, in the method of the invention, the solvent is selected from dichloromethane, cyclohexane, toluene, ethyl acetate, diethyl ether, 2-butanone, 1-methyl-2-pyrrolidone (NMP), tetrahydrofuran, N,N-dimethylformamide, dimethylsulfoxide, acetone, ethanol or acetonitrile, or mixtures of two or more of the latter.

Still preferably, the method of the invention further comprises a step o) of sorting the metals separated in step c).

Figure 2:
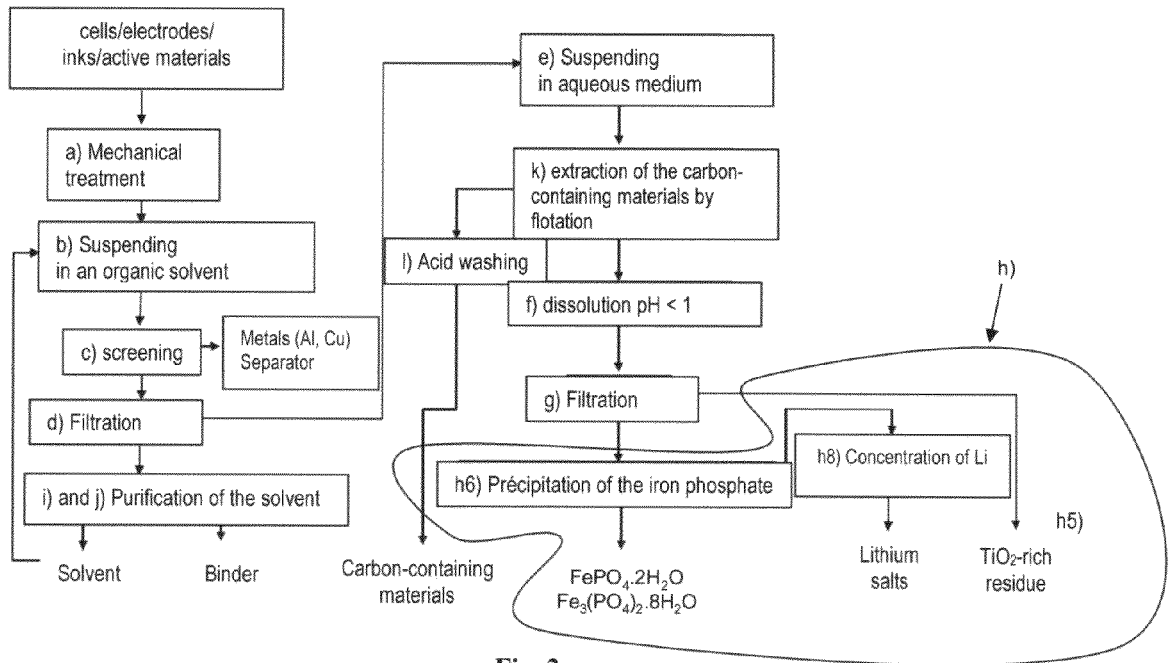

The invention will be better understood and other features and advantages thereof will become clearer on reading the explanatory description given below, which refers to the appended figures in which:

FIG. 1 shows the flowchart of the first embodiment of the method of the invention, FIG. 2 shows the flowchart of the second embodiment of the method of the invention, FIG. 3 shows the X-ray diffraction spectrum of the iron(II) phosphate ($Fe_2(PO_4)_3.8H_2O$) obtained by the method of the invention after steps h4b) and h6b), FIG. 4 shows the X-ray diffraction spectrum of the iron(III) phosphate ($FePO_4.2H_2O$) obtained after carrying out the second embodiment of the method of the invention after steps h4d) and h6d), FIG. 5 shows the X-ray diffraction spectrum of the lithium phosphate ($Li_3PO_4$) obtained after carrying out the first embodiment of the method of the invention in steps h1) and h8), FIG. 6 shows the X-ray diffraction spectrum of the lithium carbonate ($Li_2CO_3$) obtained after carrying out the second embodiment of the method of the invention in steps h1d) and h8d), FIG. 7 shows the spectrum obtained by infrared spectroscopy (FTIR) of the polyvinylidene fluoride (PVDF), the extract recovered at the end of step j) from a used electrode based on LFP by the method of the invention.

The method of the invention makes it possible to recycle the active materials from used batteries of the Li-ion type, i.e. lithium, iron and titanium.

This method also makes it possible to recycle semifinished products regarded as production wastes such as the powders of active materials, i.e. LFP, graphite and/or LTO, and optionally carbon nanoparticles that are introduced into the electrodes as additives, the coating inks for the electrodes and the binder of the electrodes.

However, the method of the invention can also be used for recycling noncompliant electrodes or batteries and therefore not only used batteries or electrodes.

The method of the invention is based on mechanical and hydrometallurgical treatment permitting recovery of quite a large number of materials and possible utilization thereof as secondary raw materials in the manufacturing chain for new cells.

It aims in particular to recover lithium, iron and phosphates and convert them to salts that can then be reintroduced in the manufacture of new batteries.

The method of the invention also allows recovery of the carbon-containing active materials derived from the negative carbon electrode or additives of the nanoparticle type contained in LFP and LTO electrodes, current collectors as well as active materials not containing carbon, i.e. LFP and/or LTO, with a view to reuse in the manufacturing chain for batteries, in the form of precursors.

The method of the invention comprises a combination of steps of mechanical treatment coupled to steps of chemical treatment.

The combination of these steps is described in the form of a flowchart in FIG. 1 and in FIG. 2.

The method of the invention will be described with reference to FIGS. 1 and 2.

In the foregoing and hereinafter, when no particular atmosphere or particular temperature is stated, the step in question takes place under air and at room temperature.

Room temperature means a temperature between 17 and 30° C.

As can be seen in FIGS. 1 and 2, the first step of the method for recycling lithium battery electrodes and/or lithium batteries of the present invention is a step a) of grinding-crushing of these used or noncompliant electrodes and/or batteries.

This step is carried out using a blade or disk grinding mill, for example.

The solid fraction resulting from this step, which is intended to pass to the next step of the method of the invention, is composed of chips with dimensions between 0.5 and 2 cm, inclusive.

The second step of the method of the invention, as can be seen in FIGS. 1 and 2, is a step b) in which organic and/or polymeric components contained in the charge recovered in step a), i.e. organic and/or polymeric components of said electrodes and/or of said batteries, are dissolved in an organic solvent.

For this, the charge recovered is put in a tank in the presence of an organic solvent capable of dissolving the binder of the electrodes, generally polyvinylidene fluoride (PVDF).

In this step b), the solid/liquid weight ratio is preferably between 1 and 20%.

Preferably, this dissolution is carried out with stirring at 30 rev/min for 4 hours at room temperature. The solvent used can be selected from: dichloromethane, cyclohexane, toluene, ethyl acetate, diethyl ether, 2-butanone, 1-methyl-2-pyrrolidone (NMP), tetrahydrofuran, N,N-dimethylformamide, dimethylsulfoxide, acetone, ethanol or acetonitrile, or mixtures of two or more of the latter.

Still as can be seen in FIGS. 1 and 2, this step b) is followed by a step c) of separating the metals that were not dissolved in step b). These metals come from the current collectors and are, in particular, copper and/or aluminum.

This step is a screening step for separating the pulverulent materials in suspension from the massive elements in the form of chips such as the metallic collectors, which are of copper and of aluminum, the separator, which is made of polymer, and the alloys of the envelopes of the batteries, i.e. the packaging of aluminum or of polymers.

These massive elements are then sorted by usual methods such as the application of electric fields for steels, of Foucault currents for aluminum alloys and by sedimentation for the polymers, in particular constituting the separator.

Then, as shown in FIGS. 1 and 2, in step d) of the method of the invention, the suspension containing the active materials and the binder dissolved in the organic solvent and from which the metals have been separated is then, in step d), filtered through a filter press.

The solid mass (cake) retained on the filter of the filter press is, in the step designated e) in FIGS. 1 and 2, recovered and suspended in water, preferably in a flotation cell.

The hydrophobic carbon-containing materials are not wetted by water and have a natural tendency to rise to the surface, whereas the compounds of the oxide or phosphate type are hydrophilic and tend to settle to the bottom of the cell.

This separation between hydrophobic carbon-containing materials and hydrophilic compounds of the oxide or phosphate type can be activated by using coagulants such as acrylamide copolymers and by injecting air.

The method of the invention then comprises a step f) of recovering the sedimented and/or coagulated material at the end of step e): this material is resuspended by stirring and adding an acid such as HCl, $HNO_3$ or $H_2SO_4$, to obtain a pH<5, preferably <4, in the step designated f) in FIGS. 1 and 2.

In this step, continuous stirring at 30 rev/min for 8 hours allows selective extraction of the lithium contained in the active materials not containing carbon.

It is possible to apply ultrasound to reduce the duration of this extraction.

In this case, the treatment time can be just 4 hours.

This is then followed by the step designated g) in FIGS. 1 and 2 of the method of the invention, which consists of filtering the suspension obtained in the preceding step f) in a filter press.

This is followed by the step designated h) in FIGS. 1 and 2, of separating the iron and lithium. For separating the iron, it is precipitated with phosphate ions, obtaining iron phosphate. For separating the lithium, a lithium salt is precipitated. Unreacted phosphate ions still remain in the filtrate.

Titanium is also recovered after this step h).

Different ways of separating iron, lithium and titanium can be used depending on the pH used and the presence or absence of $H_2O_2$ in step f).

Thus, in a first variant of the method of the invention, in step f), the pH of the suspension is adjusted to a pH below 4.

At this pH, lithium goes into solution in the aqueous medium.

However, the pH must not be below 3 as the other elements of the materials such as iron and phosphorus go into solution at a pH<3. Titanium also goes into solution at a pH<2. They could contaminate the salts obtained from the lithium.

Thus, by selecting a pH such that 3<pH<4 in step f), only the lithium goes into solution in the aqueous medium and in step g) of filtering the suspension obtained in step f), and the lithium dissolved is present in the filtrate obtained in step g), and the other materials remain on the filter.

Step h) then comprises the following steps:
  a step h1) of recovering the filtrate resulting from step g) and precipitating a lithium salt, and
  a step h2)) of recovering the solid fraction retained on the filter press in step g), dissolving this solid fraction in an aqueous medium and then adjusting the pH to a pH such that 2<pH<3. In this step the pH was adjusted to a value below 3 but above 2 to avoid dissolving the titanium; the iron and the phosphates go into solution but the titanium still remains in solid form.

This is then followed by a step h3) of filtering the suspension obtained in step h2)). The solid titanium is recovered on the filter and then the iron phosphate contained in the filtrate obtained in step h2)) is precipitated.

Then, in the step designated h4) in FIG. 1, the iron phosphate contained in the filtrate from step h3) is precipitated.

However, it is also possible to proceed as shown in FIG. 2, i.e. according to the second embodiment of the method of the invention: in step f) the pH is adjusted to a pH below 3 but above 2.

In this case, as noted above, the lithium, the iron and the phosphates go into solution but the titanium does not.

Step h) then comprises the step of recovering the solid titanium retained on the filter in step g).

The filtrate is then recovered in step h6).

Then iron phosphate is precipitated and this iron phosphate is separated in a step h7), by filtering the solution.

Then, in step h8), the filtrate obtained after this filtration in step h7) is recovered and the lithium salt is precipitated.

The filtration steps h3) and h7) can be carried out on any type of filters such as of paper, of plastic, etc., but having a pore size below 2 µm.

In the two embodiments of the invention, precipitation of the iron phosphate can be carried out in two different ways.

In a first variant of the two embodiments of the method of the invention, the step of precipitation of the iron phosphate, designated h4) in the first embodiment of the method of the invention shown in FIG. 1 or designated h6) in the second embodiment of the method of the invention shown in FIG. 2, comprises steps h4a) or h6a) of adjusting the pH of the filtrate recovered in these steps to a pH equal to 5.

For this purpose, any base known by a person skilled in the art can be added, such as sodium hydroxide (NaOH), or ammonia ($NH_3$).

A precipitate with a sky-blue color is formed.

This precipitate is recovered by filtration in step h4b) or h6b), depending on the embodiment.

The precipitate recovered is then washed with water and then dried under primary vacuum (i.e. a pressure <10 mbar). It should be noted that while there is water in the precipitate, the temperature is 15° C. The temperature rises once drying has ended and it must not exceed 30° C., because above that, ferric iron ($Fe^{3+}$) is oxidized to ferrous iron ($Fe^{2+}$) and the compound is destabilized.

On completion of drying, an iron phosphate of formula $Fe_3(PO_4)_2.8H_2O$ is obtained, as shown by the spectrum obtained by X-ray diffraction analysis shown in FIG. 3.

A second way of forming a precipitate of iron phosphate is as follows: in a step h4c) or h6c), depending on the embodiment, all of the iron in solution is oxidized to $Fe^{3+}$.

This is done by adding 1 vol %, relative to the total volume of filtrate recovered, of $H_2O_2$ at 30 vol %.

Then, in a step h4d) or h6d), the pH is raised again by adding a base to a pH=5. A white precipitate is formed. After drying at 50° C., an amorphous precipitate of iron phosphate $FePO_4.2H_2O$ is obtained.

Then, if desired, this amorphous iron phosphate can be calcined at 500° C. in air to obtain impurity-free crystalline iron phosphate $FePO_4.2H_2O$.

This is confirmed by the X-ray diffraction spectrum shown in FIG. 4.

Thermogravimetric analysis of this crystalline iron phosphate confirms hydration of the compound obtained at the end of the step of calcining at 500° C. with 2 moles of water.

Regarding the step of precipitating a lithium salt, in step h), it can be carried out according to three variants.

In a first variant, the solution obtained after the filtration in step g), in the first embodiment of the method of the invention, or step h7) in the second embodiment of the method of the invention, i.e. the filtrate, is poured into a basic solution having a pH above 12 and containing a quantity of phosphate ions ($PO_4^{3-}$) at least greater than one third of the quantity of lithium ions $Li^+$.

After heating at 50° C., a precipitate is obtained.

This is step h1a) or h8a) of the method of the invention.

This precipitate is washed with water, in step h1b) or h8b).

X-ray diffraction analysis shows that this precipitate does indeed correspond to the lithium salt of formula $Li_3PO_4$.

The X-ray diffraction spectrum obtained for this precipitate is shown in FIG. 5.

In a second variant, step h1) or h8) of the respective embodiments of the method of the invention, a precipitate of lithium salt is obtained as follows: in a step h1c) or h8c), respectively, the filtrate obtained in step g) in the first embodiment of the method of the invention, or in step h7) in the second embodiment of the method of the invention, is poured into an aqueous solution having a pH above 12 and containing a quantity of carbonate ions ($CO_3^2$) at least equivalent to half the quantity of lithium ions ($Li^+$) contained in the mixture.

Owing to the appreciable solubility of the lithium carbonate of formula $Li_2CO_3$ at room temperature, i.e. 1.54 g/100 ml, it is preferable to increase the temperature of the solution to between 90° C. and 100° C., more preferably to 100° C., as the solubility of lithium carbonate is lower at these temperatures. It is 0.72 g/100 ml.

The lithium carbonate precipitate is recovered by filtration at a temperature of 100° C.

In a third variant of the two embodiments of the method of the invention, step h1) or step h8) comprises the following steps:

h1e) or h8e) passing the filtrate obtained in step g) over a cationic ion-exchange resin at a ratio moles of $Li^+$ present in the solution/g of resin between $10^{-6}$ and $10^{-2}$.

The resins that can be used consist of polymers with functional groups of the sulfonic ($-SO_3^-$) or carboxyl ($-COO^-$) type. Examples of such resins are the resins marketed under the reference Dowex® 50WX2, and the resins marketed under the reference AMBERLITE®. Activated carbons or zeolites can also be used.

Preferably, a cationic ion-exchange resin of the Dowex® 50WX2 type is used, which makes it possible, by fixing the $Li^+$ ions, to obtain a solution with higher $Li^+$ concentration and consequently a higher yield in recovery of lithium. For this purpose, the solution resulting from the selective extraction of $Li^+$ (steps h1) or h8)) is brought in contact with this resin at a ratio moles of $Li^+$ present in the solution/g of resin between $10^{-6}$ and $10^{-2}$.

Then, in step h1f) or h8f), the resin is brought in contact with a solution of acid at a pH<3 with a liquid/resin volume ratio <1. Any type of acid, such as HCl, $HNO_3$, $H_2O_4$, can be used. The pH of the solution is below 3, preferably below 1, to facilitate exchange between $Li^+$ fixed on the resin and $H^+$ of the acid.

In step h1g) or h8g), the lithium carbonate precipitated is then recovered by filtration at 100° C. from the suspension obtained in step h1f) or h8f).

The method of the invention, in all its embodiments and all its variants, can further comprise a step i) of purifying the solvent contained in the filtrate obtained in step d), by centrifugation, preferably at 4000 rev/min for 10 minutes, until a colorless liquid is obtained, followed by a step j) of evaporation-condensation of this colorless liquid at a temperature less than or equal to 80° C. but greater than or equal to 60° C.

Then on the one hand a solid is recovered consisting of the binder of the electrodes and a liquid consisting of the organic solvent used in step b), which is then reinjected in said step b), if desired.

The method of the invention, in all its embodiments and all its variants, can moreover also comprise a step k) of extracting the carbon-containing material from the suspension obtained in step e), by flotation, a step l) of washing these carbon-containing materials with an aqueous solution acid having a pH<3, and finally a step m) of filtering these carbon-containing materials.

Once again in all its embodiments and all its variants, the method of the invention can further comprise a step n) of recycling the solvent obtained in step j) to step b).

Still in all its embodiments and all its variants, the method of the invention can further comprise a step o) of sorting the metals separated in step e), in particular with the aim of recovering the current collectors.

Thus, as can be seen, the invention offers the advantage of increasing the yield of the materials contained in the batteries relative to the conventional methods.

Moreover, it can increase the value of the recycled products by endowing them with chemical properties compatible with reintroduction into the manufacturing chain for new batteries.

In fact, $Li_3PO_4$, $Li_2CO_3$, $Fe_3(PO_4)_2.8H_2O$ and $FePO_4.2H_2O$ can be used in the synthesis of LFP and LTO electrode materials.

The binder of the electrodes, the current collector and the solvent can be reused either in the method of recycling of the invention for the solvent, or in the manufacture of new batteries for the collector, or else in the manufacture of new electrodes for the binder.

For better understanding of the invention, several embodiment examples will now be described, as nonlimiting examples purely for purposes of illustration.

EXAMPLE 1

Treatment of Scrap from LFP Electrode Production 100 g of LFP electrode composed by weight of 74.9% of LFP, 4.2% of carbon, 3.7% of PVDF and 17.2% of aluminum foil, is put in 1 L of DMSO in the form of chips of about 1 cm². After stirring for 4 h at 30 rev/min, the aluminum chips are separated from the suspension by screening. Their appearance indicates absence of particles of carbon or of LFP on the surface of the aluminum. The amount recovered corresponds to the total amount of aluminum foil used as collector. The suspension is filtered in a filter press and the solvent, after centrifugation, is evaporated at 75° C. and then condensed using a condensing column. 98% of the solvent is thus recovered and can be reused for a new extraction operation. After evaporation of the solvent, a residue is collected and corresponds to 3.65 g or 98.7% of the total amount of PVDF introduced during its production.

The cake resulting from the press-filtration operation is then suspended in 900 ml of water containing 10 ml of a solution of polydiallyldimethylammonium chloride (poly-DADMAC®) marketed by the company SNF. The suspension is agitated by bubbling with air in a flotation cell. After 4 h, the dross is recovered. Analysis of this by X-ray diffractometry (XRD) shows graphite exclusively. Chemical analysis was carried out, and showed the presence of a very small amount (<0.2 wt % relative to the weight of graphite) of LFP. The latter disappears after washing with hydrochloric acid (0.1 mol/l).

After extraction of the carbon particles, the suspension is acidified by adding concentrated HCl (36%) to pH=4. After stirring for 8 h, the suspension is filtered in a filter press and the supernatant is poured into a soda solution at pH=12 at 50° C. containing a concentration of $(NH_4)_2HPO_4$ of 30 g/l. After 4 h, the precipitate formed is filtered and then washed. 17.6 g of $Li_3PO_4$ is obtained, which corresponds to recovery of 96.1% of the lithium contained in the 100 g of electrode.

The solid fraction resulting from the press-filtration step is then put in an acidic solution of concentrated HCl. The solution has pH=1. After stirring for 4 h, almost all the solid has dissolved. The solution pH is gradually increased again to pH 5. A sky-blue precipitate forms. After filtration and washing, the solid recovered is put in a container under vacuum equipped with a thermocouple, the end of which is put in the solid. The container is put on a hot plate set at 60° C. However, until complete drying of the solid the temperature is measured as 15° C. Once this rises above 20° C., the heating is switched off and the vacuum is broken. Analysis by XRD shows that the solid recovered and dried corresponds to the formula $Fe_3(PO_4)_2.8H_2O$. The weight of iron(II) phosphate is 115.1 g, which represents a rate of recovery and utilization of the iron in the form of phosphate greater than 96.7% relative to the iron contained initially.

EXAMPLE 2

Treatment of Scrap from LTO Electrode Production 100 g of LTO electrode composed by weight of 80.0% of LTO, 7.0% of carbon, 3.0% of PVDF and 10.0% of aluminum foil, is put in 1 L of N-methyl-2-pyrrolidone (NMP) in the form of chips of about 1 cm². After stirring for 4 hours at 30 rev/min, the aluminum chips are separated from the suspension by screening. Their appearance indicates absence of particles of carbon or of LTO on the surface of the aluminum. The amount recovered corresponds to the total amount of aluminum foil used as collector. The suspension is filtered in a filter press and the solvent, after centrifugation, is evaporated at 95° C. and then condensed using a distillation column. 98 vol % of the solvent is thus recovered and can be reused for a new extraction operation. After evaporation of the solvent, a residue is collected and corresponds to 2.86 g or 95.4% of the total amount of PVDF introduced during its production.

The cake resulting from the press-filtration operation is then suspended in 900 ml of water containing 10 ml of a solution of polyDADMAC® marketed by the company SNF. The suspension is agitated by bubbling with air in a flotation cell. After 4 hours, the dross is recovered. Analysis of this by XRD shows graphite exclusively. Chemical analysis was carried out, and showed the presence of a very small amount (<0.2 wt %) of LTO. The latter disappears after washing with hydrochloric acid (0.1 mol/l) at 80° C. for 2 hours. After extraction of the carbon particles, the suspension is acidified by adding concentrated HCl (36%) to pH=2. After 8 hours of stirring with application of ultrasound, the suspension is filtered in a filter press and the supernatant is poured into a soda solution at pH=12 at 50° C. containing a concentration of $(NH_4)_2HPO_4$ of 30 g/l. After 4 hours, the precipitate formed is filtered and then washed. 26.5 g of $Li_3PO_4$ is obtained, which corresponds to recovery of 98.5% of the lithium contained in the 100 g of electrode.

EXAMPLE 3

Treatment of Production Scrap Composed of a Mixture of LFP and LTO Electrodes 50 g of LFP electrode composed by weight of 74.9% of LFP, 4.2% of carbon, 3.7% of PVDF and 17.2% of aluminum foil and 50 g of LTO electrode composed of 80.0% of LTO, 7.0% of carbon, 3.0% of PVDF and 10.0% of aluminum foil, are put in 1 L of NMP in the form of chips of about 1 cm². After stirring for 4 h at 30 rev/min, the aluminum chips are separated from the suspension by screening. Their appearance indicates absence of particles of carbon or of LFP on the surface of the aluminum. The amount recovered corresponds to the total amount of aluminum foil used as collector. The suspension is filtered in a filter press and the solvent, after centrifugation, is evaporated at 75° C. and then condensed using a condensing column. 98% of the solvent is thus recovered and can be reused for a new extraction operation. After evaporation of the solvent, a residue is collected and corresponds to 3.31 g or 98.7% of the total amount of PVDF introduced during its production.

The cake resulting from the press-filtration operation is then suspended in 900 ml of water containing 10 ml of a solution of polyDADMAC® marketed by the company SNF. The suspension is agitated by bubbling with air in a flotation cell. After 4 h, the dross is recovered. Analysis of this by XRD shows graphite exclusively.

After extraction of the carbon particles, the suspension is acidified by adding concentrated HCl (36%) to pH=2. After 8 hours of stirring with application of ultrasound, the suspension is filtered in a filter press. At this stage, all of the LFP has gone into solution and so too has most of the lithium contained in the LTO. The TiOx-rich solid compound that remains is then recovered by filtration.

10 ml of $H_2O_2$ is added to the solution after filtration in order to oxidize the $Fe^{2+}$ ions to $Fe^{3+}$ ions. Then the pH is gradually increased by adding concentrated $NH_3$ (20%). A white precipitate then forms. It is extracted by centrifugation. The precipitate is then washed with water and dried. Analysis of this by XRD and by thermogravimetry confirms the presence of $FePO_4.2H_2O$. A total amount of 42.50 g of this compound is recovered, which represents 95.8% recovery of the iron in this form.

The solution after extraction of the iron, with a volume of about 800 ml, is poured through a column containing 600 g of DOWEX® 50WX2 type resin. The function of this resin is to fix the lithium ions. It is then washed with 300 ml of water. Then the lithium is extracted by passage of 300 ml of HCl acid at 0.1 mol/l. The first 200 ml from elution contains most of the lithium fixed on the resin. This fraction from elution is then poured with stirring into 300 ml of a solution of $Na_2CO_3$ heated to 95° C. at 4 mol/l and having a pH>12. A deposit of $Li_2CO_3$ forms and is recovered by hot filtration in order to limit the loss due to the solubility of this compound in water. After this operation, an amount of 17.3 g of $Li_2CO_3$ is obtained, which represents 80.0% of the lithium present.

The invention claimed is:

1. A method for recycling lithium battery electrodes and/or lithium batteries, the method comprising:
 a) grinding a lithium battery electrode, a lithium battery, or both, to yield organic components;
 b) dissolving the organic components in an organic solvent, thereby obtaining a first suspension comprising undissolved metals;
 c) separating the undissolved metals present in the first suspension, to yield a separated suspension;

d) filtering the separated suspension with a filter press, thereby obtaining a solid mass retained on a first filter and a first filtrate comprising the organic solvent, e) recovering the solid mass retained on the first filter, and suspending the solid mass in water, thereby obtaining an aqueous suspension comprising sedimented or coagulated materials and carbon-containing material in an aqueous medium;

f) recovering the sedimented or coagulated materials, resuspending the sedimented or coagulated materials in water to form a resulting suspension, and adjusting the pH of the resulting suspension to a pH below 5;

g) filtering the resulting suspension with a filter press, thereby obtaining a second filtrate and a solid fraction retained on a second filter; and h) separating iron by precipitating at least one iron phosphate, and separating lithium by precipitating a lithium salt.

2. The method of claim 1, wherein:

the pH of the resulting suspension is adjusted to a pH satisfying:

3<pH<4, such that only the lithium goes into solution in the aqueous medium; and the separating h) comprises h1) recovering the second filtrate and precipitating the lithium salt from the second filtrate, h2) recovering the solid fraction, dissolving the solid fraction in water to form a solid fraction suspension, and adjusting pH of the solid fraction suspension to 2<pH<3 at room temperature, such that $Fe^{2+}$ and $Fe^{3+}$ ions and the phosphate ions $PO_4^{3-}$ go into solution and titanium remains in solid form, h3) filtering the solid fraction suspension and recovering solid titanium retained on a third filter, thereby obtaining a third filtrate comprising the at least one iron phosphate, and h4) precipitating the at least one iron phosphate contained in the third filtrate.

3. The method of claim 1, wherein:

the pH of the resulting suspension is adjusted to pH<1; and the separating h) comprises h5) recovering solid titanium retained on the second filter, h6) recovering the second filtrate and precipitating the at least one iron phosphate, h7) separating the at least one iron phosphate by filtering the second filtrate, thereby obtaining the at least one iron phosphate retained on a third filter and a third filtrate containing the lithium, and h8) recovering the third filtrate and precipitating the lithium salt.

4. The method of claim 2, wherein the precipitating h4) comprises h4a) adjusting pH of the third filtrate to a pH equal to 5, to form a precipitate in a third suspension, and h4b) filtering the third suspension, thereby obtaining a fourth filtrate and the precipitate on a fourth filter, recovering the precipitate, washing the precipitate with water and drying at a temperature less than or equal to 30° C. under vacuum, to obtain iron phosphate of formula $Fe_3(PO_4)_2 \cdot 8H_2O$.

5. The method of claim 2, wherein the precipitating h4) comprises h4c) adding 1 vol % of $H_2O_2$ to the third filtrate, relative to a total volume of the third filtrate, with $H_2O_2$ at 30 vol %, to form a resulting solution, and h4d) adjusting pH of the resulting solution to a pH equal to 5 to form a precipitate, recovering the precipitate, washing the precipitate and drying at 50° C., in air, to obtain an amorphous iron phosphate $FePO_4 \cdot 2H_2O$.

6. The method of claim 5, wherein the precipitating h4) further comprises, after the adjusting h4d), calcining the amorphous iron phosphate $FePO_4 \cdot 2H_2O$ at 500° C. in air, to obtain a crystalline iron phosphate $FePO_4 \cdot 2H_2O$.

7. The method of claim 2, wherein the recovering h1) comprises h1a) mixing the second filtrate with an aqueous solution having a pH above 12 and comprising a quantity of phosphate ions ($PO_4^{3-}$) greater than one third of a quantity of lithium ions ($Li^+$) to form a mixture, and heating the mixture at 50° C., to form a precipitate, and h1b) washing the precipitate with water, to obtain lithium phosphate $Li_3PO_4$.

8. The method of claim 2, wherein the recovering h1) comprises h1c) mixing the second filtrate with an aqueous solution having a pH>12 and comprising a quantity of carbonate ions ($CO_3^{2-}$) at least equal to half of a quantity of lithium ions ($Li^+$) to form a mixture, and h1d) heating the mixture to a temperature between 90° C. and 100° C. to obtain a heated suspension, and filtering the heated suspension at 100° C., to obtain a dry extract of lithium carbonate $Li_2CO_3$.

9. The method of claim 7, wherein recovering h1) further comprises h1e) passing the second filtrate over a cationic ion-exchange resin having a molar ratio of $Li^+$ per gram of the cationic ion-exchange resin of between $10^{-6}$ and $10^{-2}$, to form a resulting resin, h1f) contacting the resulting resin with an acid solution having a pH<3 such that a liquid/resin volume ratio is <1, to obtain an acid solution suspension, and h1g) recovering lithium carbonate by filtering the acid solution suspension at 100° C.

10. The method of claim 1, further comprising:

i) purifying the organic solvent contained in the first filtrate by centrifugation until a colorless liquid is obtained, j) performing evaporation-condensation of the colorless liquid at a temperature less than or equal to 80° C. but greater than or equal to 60° C., to recover a binder solid consisting of electrode binder, and to recover the organic solvent, and n) optionally recycling the organic solvent to the dissolving b).

11. The method of claim 1, further comprising:

k) extracting the carbon-containing material by flotation, l) washing the carbon-containing material with an acidic aqueous solution having a pH<3, and m) filtering the carbon-containing material.

12. The method of claim 1, wherein the organic solvent is selected from the group consisting of dichloromethane, cyclohexane, toluene, ethyl acetate, diethyl ether, 2-butanone, 1-methyl-2-pyrrolidone (NMP), tetrahydrofuran, N,N-dimethylformamide, dimethylsulfoxide, acetone, ethanol, acetonitrile, and a mixture thereof.

13. The method of claim 1, further comprising:

o) sorting the undissolved metals.

14. The method of claim 1, wherein in the recovering f) the pH of the resulting suspension is adjusted to a pH below 4.

15. The method of claim 3, wherein the separating h) further comprises h4a) adjusting a pH of the second filtrate recovered in the recovering h6) to a pH equal to 5, to form a pH-adjusted suspension comprising a precipitate, and h4b) filtering the pH-adjusted suspension to obtain the third filtrate and the precipitate on the third filter, recovering the precipitate, washing the precipitate with water and drying at a temperature less than or equal to 30° C. under vacuum, to obtain iron phosphate of formula $Fe_3(PO_4)_2 \cdot 8H_2O$.

16. The method of claim 2, wherein the precipitating h4) comprises h4a) adjusting pH of the third filtrate to a pH equal to 5, to form a pH-adjusted suspension comprising a precipitate, and h4b) filtering the pH-adjusted suspension to obtain a fourth filtrate and the precipitate on a fourth filter, recovering the precipitate, washing the precipitate with water and drying at a temperature less than or equal to 30° C. under vacuum, to obtain iron phosphate of formula $Fe_3(PO_4)_2 \cdot 8H_2O$.

17. The method of claim 3, wherein the separating h) comprises h4c) adding 1 vol % of $H_2O$ to the second filtrate recovered in the recovering h6), relative to a total volume of the second filtrate, with $H_2O_2$ at 30 vol %, to form a resulting solution, and h4d) adjusting pH of the resulting solution to a pH equal to 5 to form a precipitate, recovering the precipitate, washing the precipitate and drying at 50° C., in air, to obtain an amorphous iron phosphate $FePO_4 \cdot 2H_2O$.

18. The method of claim 3, wherein the separating h) comprises h1a) mixing the second filtrate with an aqueous solution having a pH above 12 and comprising a quantity of phosphate ions ($PO_4^{3-}$) greater than one third of a quantity of lithium ions ($Li^+$) to form a mixture, and heating the mixture at 50° C., to form a precipitate, and h1b) washing the precipitate with water, to obtain lithium phosphate $Li_3PO_4$.

19. The method of claim 3, wherein the separating h) comprises h1c) mixing the second filtrate with an aqueous solution having a pH>12 comprising a quantity of carbonate ions ($CO_3^{2-}$) at least equal to half of a quantity of lithium ions ($Li^+$) to form a mixture, and h1d) heating the mixture to a temperature between 90° C. and 100° C. to obtain a heated suspension, and filtering the heated suspension at 100° C., to obtain a dry extract of lithium carbonate $Li_2CO_3$.

* * * * *